3,445,557
PROCESS FOR PREPARING FILAMENTS FROM
β-POLYAMIDES
Ernst Horoldt, Kelkheim, Taunus, Germany, assignor to
Farbwerke Hoechst Aktiengesellschaft vormals Meister
Lucius & Bruning, Frankfurt am Main, Germany, a
corporation of Germany
No Drawing. Filed Apr. 19, 1965, Ser. No. 449,283
Claims priority, application Germany, Apr. 18, 1964,
F 42,651
Int. Cl. D02j 1/22; D01f 7/04
U.S. Cl. 264—210                             3 Claims

ABSTRACT OF THE DISCLOSURE

A process for preparing beta-polyamides is disclosed which consists of spinning an acid solution of the polymer at room temperature into an aqueous coagulating bath at a temperature of 5° C. to 50° C. and then drawing the coagulated filaments 3 to 15 times their original length outside the coagulating bath.

---

The present invention relates to a process for preparing filaments from β-polyamides.

The melting points of the poly-β-lactams that may be used for the preparation of fibers are in part so high that these compounds can be processed in the dissolved state only. In Belgian Patent 618,510 it has been proposed to use methanolic calcium sulfocyanate solutions as solvents for the preparation of spinning solutions of poly-β-lactams, in particular poly-4,4-dimethylazetidin-2-one. Since the methanolic calcium sulfo-cyanate solutions have a relatively poor capacity of dissolving poly-β-lactams (cf., inter alia, "Angewandte Chemie," 74, 528, 1962), and the polymers are present in them in a very coiled form, unobjectionable fibrous material can be spun from these solutions only under particular conditions. It is also known that polyamides containing a higher number of carbon atoms between two carbamide groups are soluble in acids and yield solutions which can be spun.

According to German Patent 1,099,727 β-polyamides of β-lactams disubstituted in 4-position, in which the chain of carobn atoms between the recurring atom group CO—NH— consists of no more than two chain members can only be dissolved in acids with the simultaneous degradation of the polymers. In Belgian Patent 618,510 it has also been mentioned that the known β-polyamides are quickly hydrolyzed under the action of an acid at room temperature already and that for this reason acids are not suitable for use in the preparation of spinning solutions.

Now I have found that filaments of β-polyamides can advantageously be prepared by spinning a solution of 5 to 50% strength of polymers, copolymers or mixtures of polymers of β-lactams that are monosubstituted in 4-position and, if desired, substituted in 3-position, in an acid into an aqueous coagulation bath and drawing the coagulated filaments to 3 to 15 times their original length.

The filaments may be prepared from polymers, copolymers or mixtures of polymers of β-lactams of the formula

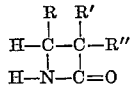

in which R may represent an alkyl group containing 1 to 18 carbon atoms, an aryl group, an aralkyl group or a cycloalkyl group. The groups may be substituted. R' and R" each represent an alkyl group containing 1 to 18 carbon atoms, an aryl, aralkyl or cycloalkyl group or a hydrogen atom. The groups R' and R" may likewise be substituted. The alkyl groups may also be branched.

As examples of poly-β-lactams which may be spun when dissolved in an acid either as such or in the form of the copolymers or polymer mixtures the following compounds may be mentioned: poly-4-methyl-azetidin-2-one, poly-3,4-dimethyl-azetidin-2-one, poly-4-ethylazetidin - 2 - one, poly - 4 - phenylazetidin - 2 - one, poly - 4 - (p - methyl - phenyl) - azetidin - 2 - one, poly - 4 - (p-chlorophenyl)-azetidin-2-one, poly-4-n-propylazetidin-2-one, poly-3,3-dimethyl-3-methyl-azetidin-2-one, poly-3,3-dimethyl-4-phenylazetidin-2-one and, poly-4-isopropyl-azetidin-2-one. It may also be possible to spin the polymers obtained from the cis- and trans-forms of the monomers, these polymers being used as such or in their optically active form after separation of the racemates. As examples of such compounds there may be mentioned the polymer or copolymer or polymer mixture of cis- or trans-3,4-dimethylazetidin-2-one.

As solvents there may be used in principle all inorganic or organic acids in which the polymers are sufficiently soluble, for example, sulfuric acid, phosphoric acid, nitric acid, acetic acid, formic acid, thioglycolic acid, monochloroacetic acid, dichloroacetic acid, trichloroacetic acid, trifluoroacetic acid, lactic acid, pyroracemic acid or hydroxyethane sulfonic acid, in particular acids having a constant of dissociation of more than $10^{-5}$, in particular halogenated acetic acids and the mother liquors forming in the preparation of mono-, di- and trichloroacetic acids, for example, those comprising 45 to 55% of dichloroacetic acid, 10 to 13% of acetic acid, 35 to 40% of monochloroacetic acid, 1% of trichloroacetic acid and small quantities of water and dissolved hydrogen chloride. Preferably, concentrated formic acid is used.

The polymers, copolymers or mixtures of polymers are advantageously dissolved in the acid, while stirring. When the spinning solution is free from bubbles, which can be brought about by a usual degassing process or a short storage and in general takes some hours, the spinning process can begin. It is not necessary to filter the spinning solution before the spinning process.

The concentration of polymers in the spinning solution depends on the viscosity of the polymers or their molecular weight and on the distribution of the molecular weight. It may vary between 5 and 50%. The viscosity of the spinning solution, at 20° C., measured according to the usual falling ball test (steel balls according to DIN specification 5401, diameter 2.5 millimeters, type +5, SKF) may correspond to a period of fall of the ball within the range of 40 to 800 seconds. The relative viscosity of the polymers used, measured in a solution of 1% strength in concentrated sulfuric acid, at 20° C., may vary within the range of 2 to 300.

The spinning solutions can be spun by means of the apparatus that are generally used in wet spinning processes. The coagulation bath in general consists of water and may flow in a direction equal or opposite to the direction of the filament. In cases in which the coagulation power of the water alone is not sufficient to coagulate the filament coming from the spinning nozzle aqueous salt solutions are used as coagulation agents. As salts may be used, for example, sodium chloride, potassium chloride, zinc chloride, zinc sulfate or sodium sulfate. Depending on the degree of coagulation of the polymer the salt concentrations may vary between 0.1 and 50%. Solutions of poly-4-methylazetidin-2-one can, for example, advantageously be spun into good filaments when an aqueous sodium chloride solution of 15% strength is used as the coagulation bath. The temperature of the coagulation bath may be within the range of 5° to 50° C. For reasons of simplicity the spinning process is preferably carried out at the prevailing room temperature. The length of the coagulation bath may vary within wide limits and is advantageously within the range of 45 to 130 cm.

The process according to the invention offers the particular advantage that a contamination or incrustation of the nozzles, which sometimes occurs in other known wet spinning processes, does practically not take place and it is therefore not necessary for a long time to replace the spinning nozzles during the spining process.

The coagulated bundle of filaments is drawn off through the coagulation bath at a speed of 1 to 50, preferably 1 to 8, meters per minute. After the filaments have left the coagulation bath they are drawn to 3 to 15 times their original length. The drawing is advantageously brought about by means of two three-roller systems. The filaments may be drawn in water or in the air. The temperature of the water may vary within wide limits, viz. within the range of 5° C. to the boiling point of the water. If desired or required, surface-active substances may be added to the drawing bath. When the drawing takes place in the air the filament is advantageously conducted during the drawing operation through a zone heated to a temperature within the range of 60° to 300° C. The filaments may be drawn again in a second drawing bath. Particularly good filaments are obtained when the bundle of filaments that has left the aqueous drawing baths which preferably have a temperature within the range of 10° to 30° C. is heat-set in the drawn state at a temperature within the range of 60° to 300° C. and then wound on an inflexible bobbin or a shrinkage bobbin. During the winding operation the filaments may again be drawn. The filaments thus obtained are already dry and can immediately by further processed. Their shrinkage on boiling is below 15%. The thermal treatments which in the known processes for preparing filaments from methanolic calcium thiocyanate solutions of β-polyamides, for example, poly-4,4-dimethylazetidin-2-one, have been applied separately after the spinning process did not lead to an improvement of the tensile strength of the spun filament. In contradistinction thereto a β-polyamide which according to the invention is dissolved in an acid can be heat-set during the spinning process and the tensile strength of the filament which has thus been treated is considerably increased.

If no heat-setting is carried out during the spinning process, that is to say, if the filaments are wound up while wet, it is advantageous to subject the filament subsequently, if desired or required, after an intermediate drying, to one of the usual heat-setting processes, for example, a treatment with hot water.

The following examples serve to illustrate the invention but they are not intended to limit it thereto.

Example 1

A solution of 15 parts by weight of poly-4-methyl-azetidin-2-one having a relative viscosity of 14.1 (measured in a solution of 1% strength in concentrated sulfuric acid, at 20° C.) in 85 parts by weight of formic acid of 96% strength was spun by means of a nozzle of gold and platinum having 60 openings of a diameter of 60µ each into an aqueous coagulation bath containing 16% of sodium chloride. According to the falling ball test (steel balls having a diameter of 2.5 mm.) the viscosity of the spinning solution at 20° C. corresponded to a time of fall of the ball of 84 seconds. The portion of the coagulation bath through which the filaments had to pass had a length of 127 cm. The spinning solution was pressed from an autoclave under a pressure of 2.5 atmospheres of nitrogen over a spining arc into the coagulation bath which had a temperature of 21° C. and was then drawn off via three-roller-systems at a speed of 3.0 meters per minute. The time of stay of the filament in the coagulation bath was 25 seconds. The filament was then drawn in a bath having a length of 115 cm. and containing water of 25° C. and 0.01 to 2% of a hyroxyethylated alkyl phenol, by four times it original length. Simultaneously, the filament was washed. The moist filament was conducted over three iron plates arranged one behind the other and having a length of 35 cm. each and a temperature of at least 230° C. During this treatment the filament was drawn again to a small extent. Subsequently it was wound on an inflexible bobbin at a speed of 13 meters per minute. The heat-set filament was completely dry and had a tensile strength of 3.10 g. per denier, an elongation at break of 14% and a total titer of 109 denier, the individual filaments having a titer of 1.8 denier. The filament had a dim lustre.

Example 2

A spinning solution which had been prepared from 15 parts by weight of poly-3,4-dimethylazetidin-2-one having a relative viscosity of 8.2 (measured in a solution of 1% strength in concentrated sulfuric acid, at 20° C.) and 85 parts by weight of formic acid of 96% strength, was spun under a pressure of 2.2 atmospheres through a nozzle of gold and platinum having 60 openings of a diameter of 80µ each, into water serving as the coagulation bath. According to the falling ball test the viscosity of the solution at 20° C. corresponded to a time of fall of the ball of 173 seconds. The portion of the coagulation bath through which the filament passed had a length of 115 cm. The coagulation bath had a temperature of 22° C. 20 liters per hour of water flowed through the coagulation bath in a direction opposite to the direction of the filament. The coagulated filament was drawn off at a speed of 2.0 meters per minute and drawn in an aqueous drawing bath having a length of 130 cm. and a temperature of 18° C. to seven times its original length. After having passed through a washing bath having a length of 115 cm. the filament was drawn off at a speed of 16 meters per minute and dried on a shrinkage bobbin.

The filament thus obtained was very transparent and had a brilliant lustre. It had a tensile strength of 2.63 grams per denier, an elongation at break of 16% and a total titer of 53.4 denier, the titer of the individual filaments being 0.9 denier.

Example 3

A solution was prepared from 11.8 parts by weight of poly-4-ethylazetidin-2-one having a relative viscosity of 4.5 (measured in a solution of 1% strength in concentrated sulfuric acid, at 20° C.) and 88.2 parts by weight of the mother liquor obtained in the preparation of monochloroacetic acid and comprising 35 to 40% of monochloroacetic acid, 45 to 55% of dichloroacetic acid, 10 to 13% of acetic acid, 1% of trichloroacetic acid and small quantities of water and dissolved hydrogen chloride. After three days this solution was pressed at room temperature under a pressure of 2.9 atmospheres through a nozzle of gold and platinum having 60 openings of a diameter of 80µ each, into a coagulation bath which had a length of 90 cm. and contained an aqueous sodium chloride solution of 16% strength and a temperature of 20° C. The coagulated bundle of filaments was drawn off at a speed of 1.8 meters per minute and drawn in a drawing bath arranged after the coagulation bath and containing water at 19° C. to six times its original length. The filament was washed with water in the drawn state and thereby freed from rests of solvent. It was then dried on a shrinkage bobbin. The silk-like filament had a tensile strength of 2.50 grams per denier, an elongation at break of 17% and a total titer of 31 denier, the individual filaments having a titer of 0.5 denier.

Example 4

15 parts by weight of a copolymer of 60% of 3,4-dimethylazetidin-2-one and 40% of 4-methylazetidin-2-one, which had a relative viscosity of 9.15 (measured in a solution of 1% strength in concentrated sulfuric acid, at 20° C.) were dissolved in 85 parts by weight of formic acid of 96% strength and the resulting solution was pressed under a pressure of 2.8 atmospheres through a nozzle of gold and platinum having 60 openings of a diameter of 80μ each into a coagulation bath. According to the falling ball test the viscosity of the spinning solution at 20° C. corresponded to a period of fall of the ball of 152 seconds. The coagulation bath consisted of an aqueous sodium chloride solution of 16% strength and had a length of 125 cm. and a temperature of 21° C. The coagulation bath flowed at a speed of 20 liters per hour in a direction opposite to the direction of the filament. The coagulated bundle of filaments was drawn off at a speed of 2.8 meters per minute and drawn in an aqueous drawing bath arranged behind the coagulation bath and having a temperature of 19.5° C. to seven times its original length. After having passed through a washing bath the filament was conducted, while being further drawn in the air, over an iron plate having a length of 35 cm. and a temperature of 250° C. and wound on an inflexible bobbin at a speed of 28.4 meters per minute. The total degree of drawing of the filament was 910%, that is to say, the filament had been drawn to 10.1 times its original length. The heat-set filament had a tensile strength of 5.05 grams per denier, an elongation at break of 7.2% and a total titer of 27.4 grams per denier, the individual filaments having a titer of 0.45 denier.

The filament had an excellent transparency and a brilliant lustre. By the heat-setting the tensile strength of the spun filament could be considerably increased. A filament which had been spun under comparable conditions but which had not been heat-set had a tensile strength of no more than 3.32 grams per denier, an elongation at break of 16.8% and a total titer of 64.3 grams per denier, the individual filaments having a titer of 1.07 denier.

Example 5

A solution which had been prepared from 16.5 parts by weight of a copolymer of 40% of 4-ethylazetidin-2-one and 60% of 4-methylazetidin-2-one, which had a relative viscosity of 6.55 (measured in a solution of 1% strength in concentrated sulfuric acid, at 20° C.) and 83.5 parts by weight of formic acid of 96% strength was pressed under a pressure of 3.3 atmospheres through a nozzle of gold and platinum having 60 openings of a diameter of 80μ each into a spinning bath consisting of water. According to the falling ball test the viscosity of the spinning solution at 20° C. corresponded to a period of fall of the ball of 89 seconds. The temperature in the coagulation bath varied between 13° and 25° C. The distance which the filament covered in the coagulation bath was 110 cm. The coagulation bath was conducted at a speed of 70 liters per hour in a direction opposite to the direction of the filament. The coagulated bundle of filaments was drawn off at a speed of 2.5 meters per minute, drawn to five times its original length, conducted immediately, without being further washed, in the air, over iron plates having a length of 35 cm. each and a temperature of 230° C. and then wound on an inflexible bobbin at a speed of 12 meters per minute. The filament which had not been further treated and which had a metallic lustre had a tensile strength of 2.87 grams per denier, an elongation at break of 17.2% and a total titer of 66 denier, the individual filaments having a titer of 1.1 denier.

Example 6

A solution which had been prepared from 15 parts by weight of a copolymer of 40% of 4-ethylazetidin-2-one and 60% of 3,4-dimethylazetidin-2-one, which had a relative viscosity of 7.3 (measured in a solution of 1% strength in concentrated sulfuric acid, at 20° C.) and 85 parts by weight of formic acid of 96% strength was pressed under a pressure of 2.8 atmospheres through a nozzle of gold and platinum having 60 openings of a diameter of 80μ each into water serving as the coagulation bath. The coagulation bath had a temperature of 22° C. and a length of 80 cm. and flowed in a direction opposite to the direction of the filament at a speed of 17.7 liters per hour. According to the falling ball test, the viscosity of the spinning solution at 20° C. corresponded to a time of fall of the ball of 115 seconds. The coagulated bundle of filaments was drawn off at a speed of 2.5 meters per minute and drawn in water at 22.5° C. to 4.5 times its original length. After having passed through a washing bath having a length of 130 cm. the filament was heat-set by being conducted over iron-plates having a temperature of 230° C. The heat-setting zone had a length of 35 cm. The filament was then wound on an inflexible bobbin at a speed of 15 meters per minute. The filament which had not been finished and which had a dull appearance had a tensile strength of 2.51 grams per denier, an elongation at break of 12.1% and a total titer of 29.7 denier, the individual filaments having a titer of 0.5 gram per denier.

I claim:

1. A process for preparing filaments from β-polyamides which process consists essentially of spinning at room temperature an acid solution of 5 to 50% strength by weight of a polymer consisting essentially of recurring units based on a β-lactam of the formula:

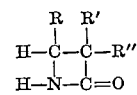

in which R may be an alkyl radical of 1 to 18 carbon atoms, an aryl radical, an aralkyl radical or a cycloalkyl radical; and R' and R'' may each be an alkyl radical of 1 to 8 carbon atoms, an aryl radical, an aralkyl radical, a cycloalkyl radical or hydrogen; introducing the spun β-lactam polymer filaments into an aqueous coagulation bath at a temperature of 5° to 50° C. and drawing the coagulated filaments that have left the coagulation bath to 3 to 15 times their original length.

2. A process as claimed in claim 1, wherein the filaments are contacted during the drawing operation to a treatment with water having a temperature within the range of 50° to 90° C.

3. A process as claimed in claim 1, wherein the filaments after being drawn are heat-set with air at a temperature within the range of 60° to 300° C.

References Cited

UNITED STATES PATENTS

| | | | |
|---|---|---|---|
| 3,154,610 | 10/1964 | Denyes | 264—184 |
| 3,269,970 | 8/1966 | Epstein et al. | 264—184 |
| 2,340,909 | 2/1944 | Traill et al. | 264—210 |
| 2,880,057 | 3/1959 | Cuculo | 264—210 |
| 2,957,852 | 10/1960 | Frankenburg et al. | 264—210 |
| 3,093,618 | 6/1963 | Graf et al. | |
| 3,156,750 | 11/1964 | Cuculo | 264—178 |

DONALD J. ARNOLD, Primary Examiner.

U.S. Cl. X.R.

264—178